United States Patent
James et al.

(10) Patent No.: US 11,323,422 B2
(45) Date of Patent: May 3, 2022

(54) REGISTERING, MANAGING, AND COMMUNICATING WITH IOT DEVICES USING DOMAIN NAME SYSTEM PROCESSES

(71) Applicant: Verisign, Inc., Reston, VA (US)

(72) Inventors: Stephen Daniel James, South Riding, VA (US); Daniel Schonfeld, Reston, VA (US); Andrew Fregly, Reston, VA (US); Eric Osterweil, McLean, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 15/701,408

(22) Filed: Sep. 11, 2017

(65) Prior Publication Data

US 2017/0374042 A1 Dec. 28, 2017

Related U.S. Application Data

(62) Division of application No. 14/593,919, filed on Jan. 9, 2015, now Pat. No. 9,762,556.

(51) Int. Cl.
*H04L 9/32* (2006.01)
*H04L 9/00* (2006.01)
(Continued)

(52) U.S. Cl.
CPC .......... *H04L 63/0442* (2013.01); *H04L 9/006* (2013.01); *H04L 61/1511* (2013.01);
(Continued)

(58) Field of Classification Search
CPC . H04L 63/0442; H04L 9/0006; H04L 63/061; H04L 63/0823; H04L 9/006
(Continued)

(56) References Cited

U.S. PATENT DOCUMENTS 7,600,166 B1 * 10/2009 Dunn ............... G01R 31/31719
714/726
9,154,571 B2 * 10/2015 Jokela ................. H04L 67/2823
(Continued)

FOREIGN PATENT DOCUMENTS

CN 103929435 A 7/2014

OTHER PUBLICATIONS

Extended European Search Report Application No. 16150640.7, dated Jun. 3, 2016, 10 pages.
(Continued)

*Primary Examiner* — Haresh N Patel
(74) *Attorney, Agent, or Firm* — Baker Botts L.L.P.; Michael A. Sartori (57) ABSTRACT

Provided herein is a method for registering an IoT device with a DNS registry. The method can include obtaining, at a DNS server, an identifier, IP address, and a public key of an asymmetric key pair associated with the IoT device from a network gateway device that is in communication with the IoT device, wherein the asymmetric key pair is provisioned onto the IoT device and an associated private key stored within a memory of the IoT device at a time that IoT device is manufactured or during a predetermined time window after manufacturing; creating at least one DNS record for the IoT device; assigning a domain name associated with the internet protocol ("IP") address to the IoT device; storing the identifier, IP address, the domain name, and the public key in the at least one DNS record; and providing confirmation of the registration to the IoT device.

13 Claims, 9 Drawing Sheets

(51) Int. Cl.
*H04L 29/06* (2006.01)
*H04L 61/4511* (2022.01)
*H04W 12/04* (2021.01)
*H04W 12/30* (2021.01)
*H04W 4/70* (2018.01)

(52) U.S. Cl.
CPC ........ *H04L 63/061* (2013.01); *H04L 63/0823* (2013.01); *H04W 12/04* (2013.01); *H04W 12/35* (2021.01); *H04W 4/70* (2018.02)

(58) Field of Classification Search
USPC .......................................................... 713/171
See application file for complete search history.

(56) References Cited

U.S. PATENT DOCUMENTS

| | | | | |
|---|---|---|---|---|
| 9,258,303 | B1* | 2/2016 | Galwas | H04L 63/0869 709/226 |
| 9,860,235 | B2* | 1/2018 | Curtis | H04L 63/0823 709/226 |
| 2003/0233454 | A1* | 12/2003 | Alkhatib | H04L 29/12396 709/226 |
| 2006/0233322 | A1* | 10/2006 | Allman | H04L 29/06027 379/88.01 |
| 2010/0202298 | A1* | 8/2010 | Agarwal | H04L 41/147 370/252 |
| 2010/0318468 | A1* | 12/2010 | Carr | G06Q 20/027 705/79 |
| 2011/0119743 | A1* | 5/2011 | Gleim | H04L 63/107 726/6 |
| 2011/0265016 | A1* | 10/2011 | Koopman | G06Q 10/107 715/752 |
| 2012/0155646 | A1* | 6/2012 | Seshadri | H04L 9/083 380/279 |
| 2012/0173685 | A1* | 7/2012 | Shorter | H04L 29/12066 709/223 |
| 2012/0185924 | A1* | 7/2012 | Tsirtsis | H04L 29/12066 726/6 |
| 2012/0224516 | A1* | 9/2012 | Stojanovski | H04L 29/12066 370/310 |
| 2012/0254386 | A1* | 10/2012 | Smith | H04L 61/1511 709/223 |
| 2012/0284505 | A1* | 11/2012 | Smith | H04L 63/123 713/151 |
| 2012/0304004 | A1* | 11/2012 | Gould | H04L 61/1511 714/15 |
| 2013/0080341 | A1* | 3/2013 | Veeramachaneni | G06Q 50/184 705/310 |
| 2013/0262860 | A1* | 10/2013 | Lamb | H04L 9/006 713/156 |
| 2014/0006930 | A1* | 1/2014 | Hollis | G06F 17/2247 715/234 |
| 2014/0040975 | A1* | 2/2014 | Raleigh | H04W 12/12 726/1 |
| 2014/0244998 | A1* | 8/2014 | Amenedo | H04L 63/062 713/156 |
| 2014/0280849 | A1* | 9/2014 | Aras | H04L 41/04 709/223 |
| 2014/0287687 | A1* | 9/2014 | Bakin | H04W 12/04 455/41.2 |
| 2014/0304785 | A1* | 10/2014 | Kafle | H04L 63/12 726/5 |
| 2014/0359131 | A1* | 12/2014 | Seed | H04W 4/70 709/226 |
| 2014/0376378 | A1* | 12/2014 | Rubin | H04W 4/00 370/235 |
| 2015/0012751 | A1* | 1/2015 | Forster | H04L 9/30 713/171 |
| 2015/0081440 | A1* | 3/2015 | Blemaster | G06Q 30/0256 705/14.54 |
| 2015/0121070 | A1* | 4/2015 | Lau | H04L 63/0823 713/164 |
| 2015/0134763 | A1* | 5/2015 | Balakrishnan | G06F 9/44505 709/208 |
| 2015/0207857 | A1* | 7/2015 | Horton | H04L 67/16 709/204 |
| 2015/0312331 | A1* | 10/2015 | Crocker | H04L 63/061 709/205 |
| 2015/0347432 | A1* | 12/2015 | Tsai | G06F 16/958 715/202 |
| 2016/0112284 | A1* | 4/2016 | Pon | H04L 43/045 709/224 |
| 2016/0203234 | A1* | 7/2016 | Piccand | G06F 17/30917 707/798 |
| 2016/0205097 | A1* | 7/2016 | Yacoub | H04L 63/0876 726/6 |
| 2016/0205106 | A1* | 7/2016 | Yacoub | H04L 61/1511 726/28 |
| 2017/0161743 | A1* | 6/2017 | Binder | G06Q 20/3829 |

OTHER PUBLICATIONS

Anonymous: "DNS-based Authentication of Named Entities (DANE)—Infoblox Experts Community", Apr. 14, 2014 (Apr. 14, 2014), pp. 1-4, XP055272620, Retrieved from the Internet: URL:https://community.infoblox.com/t5/IPv6-Center-of-Excellence/DNS-based-Authentication-of-Named-Entities-DANE/ba-p/3398 [retrieved on May 13, 2016] the whole document.

Master Thesis et al: "Leveraging Public-key-based Authentication for the Internet of Things", Master Thesis, Jul. 19, 2013 (Jul. 19, 2013), XP055161309, RWTH Aachen University, Germany Chair of Communication and Distributed Systems Retrieved from the Internet: URL:http://people.inf.ethz.ch/mshafagh/maste_thesis_Hossein_Shafagh_PKC_in_the_IoT.

Hoffman VPN Consortium J Schlyter Kiret AB P: "The DNS-Based Authentication of Named Entities (DANE) Transport Layer Security (TLS) Protocol: TLSA; rfc6698.txt", The DNS-Based Authentication of Named Entities (DANE) Transport Layer Security (TLS) Protocol: TLSA; RFC6698.TXT, Internet Engineering Task Force, IETF; Standard, Internet Society (ISOC) 4, Rue Des Falaises CH-1205 Geneva, Switzerland, Aug. 7, 2012 (Aug. 7, 2012), pp. 1-37, XP015084123, [retrieved on Oct. 27, 2011).

Barnes BBN Technologies R: "Use Cases and Requirements for DNS-Based Authentication of Named Entities (DANE); rfc6394. txt", Use Cases and Requirements for DNS-Based Authentication of Named Entities (DANE); RFC6394.TXT, Internet Engineering Task Force, IETF; Standard, Internet Society (ISOC) 4, Rue Des Falaises CH-1205 Geneva, Switzerland, Oct. 27, 2011, (Oct. 27, 2011), pp. 1-12, XP015081320, [retrieved on Oct. 27, 2011] Chapters 1-3.

Secure DNS Name Autoconfiguration for 1Pv6 Internet-of-Things Devices, Lee et al., pp. 1-8, May 2013.

* cited by examiner

REGISTERING, MANAGING, AND COMMUNICATING WITH IOT DEVICES USING DOMAIN NAME SYSTEM PROCESSES

CROSS-REFERENCE TO RELATED APPLICATIONS

This application is a Divisional of the co-pending U.S. patent application titled, "REGISTERING, MANAGING, AND COMMUNICATING WITH IOT DEVICES USING DOMAIN NAME SYSTEM PROCESSES," filed on Jan. 9, 2015 and having Ser. No. 14/593,919. The subject matter of this related application is hereby incorporated herein by reference.

BACKGROUND

The use of the Internet for purposes that extend beyond the current model of Web browsers interacting with Websites is growing rapidly. In particular, many devices are now being exposed on the Internet so as to enable interactions with those devices from devices and applications that are also connected to the Internet. As a result of this increasing usage of the Internet for interaction with connected devices, commonly called the Internet of Things (IOT), there is a growing demand for technology that enables these interactions to be performed securely in a way that protects the privacy of the data being exchanged in the interactions.

SUMMARY

In some aspects, a method for registering an internet of things ("IoT") device with a domain name system ("DNS") registry is disclosed. The method can comprise obtaining, at a DNS server, an identifier, IP address, and a public key of an asymmetric key pair associated with the IoT device from a network gateway device that is in communication with the IoT device, wherein the asymmetric key pair is provisioned onto the IoT device and an associated private key stored within a memory of the IoT device at a time that IoT device is manufactured or during a predetermined time window after manufacturing; creating at least one DNS record for the IoT device; assigning a domain name associated with the internet protocol ("IP") address to the IoT device; storing the identifier, IP address, the domain name, and the public key in the at least one DNS record; and providing confirmation of the registration to the IoT device.

In some aspects, the at least one DNS record is a TLSA record.

In some aspects, the identifier, IP address, and the public key is obtained at a cloud-based DNS-registration interface associated with the DNS server.

In some aspects, a device for registering an internet of things ("IoT") device with a domain name system ("DNS") registry is disclosed. The device can comprise a memory containing instructions; and at least one processor, operably connected to the memory, the executes the instructions to perform operations comprising: obtaining, at a DNS server, an identifier, IP address, and a public key of an asymmetric key pair associated with the IoT device from a network gateway device that is in communication with the IoT device, wherein the asymmetric key pair is provisioned onto the IoT device and an associated private key stored within a memory of the IoT device at a time that IoT device is manufactured or during a predetermined time window after manufacturing; creating at least one DNS record for the IoT device; assigning a domain name associated with the internet protocol ("IP") address to the IoT device; storing the identifier, IP address, the domain name, and the public key in the at least one DNS record; and providing confirmation of the registration to the IoT device.

In some aspects, a method of authenticating a message produced by an internet of things ("IoT") device is disclosed. The method can comprise obtaining the message from an IoT device, the message having been cryptographically signed by a private key of an asymmetric key pair associated with the IoT device and the message comprising an identifier of the IoT device and a data payload; obtaining a public key of the asymmetric key pair stored in at least one domain name system ("DNS") record associated with the IoT device; and authenticating the message using the public key.

In some aspects, the at least one DNS record is TLSA or SMIMEA record type and the at least one DNS record is signed using DNSSEC.

In some aspects, a device of authenticating a message produced by an internet of things ("IoT") device is disclosed. The device can comprise a memory containing instructions; and at least one processor, operably connected to the memory, that executes the instructions to perform operations comprising: obtaining the message from an IoT device, the message having been cryptographically signed by a private key of an asymmetric key pair associated with the IoT device and the message comprising an identifier of the IoT device and a data payload; obtaining a public key of the asymmetric key pair stored in at least one domain name system ("DNS") record associated with the IoT device; and authenticating the message using the public key.

DETAILED DESCRIPTION

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

The Internet utilizes communication processes, such as Domain Naming System (DNS) related standards, that can be leveraged in a number of ways to support data communications, device discovery and privacy protection. Aspects of the present disclosure are related to an Internet of Things (IOT) service. According to aspects, the IOT service enables interactions between entities on the Internet and IOT capabilities, many of these incorporating new uses of DNS related processes. The IOT service includes a bundle of services that allow IOT devices to be registered, authenticated, and securely communicate with consuming entities and users. The IOT service utilizes DNS processes and services to register and authenticate the IOT devices. In addition to capabilities based on new techniques of leveraging existing Internet-related processes, new capabilities can be defined that would extend those standards or provide capabilities that are not addressed by standards. The combination of these capabilities meets commonly found requirements for IOT security, privacy, communications, and data processing.

Figure 1:
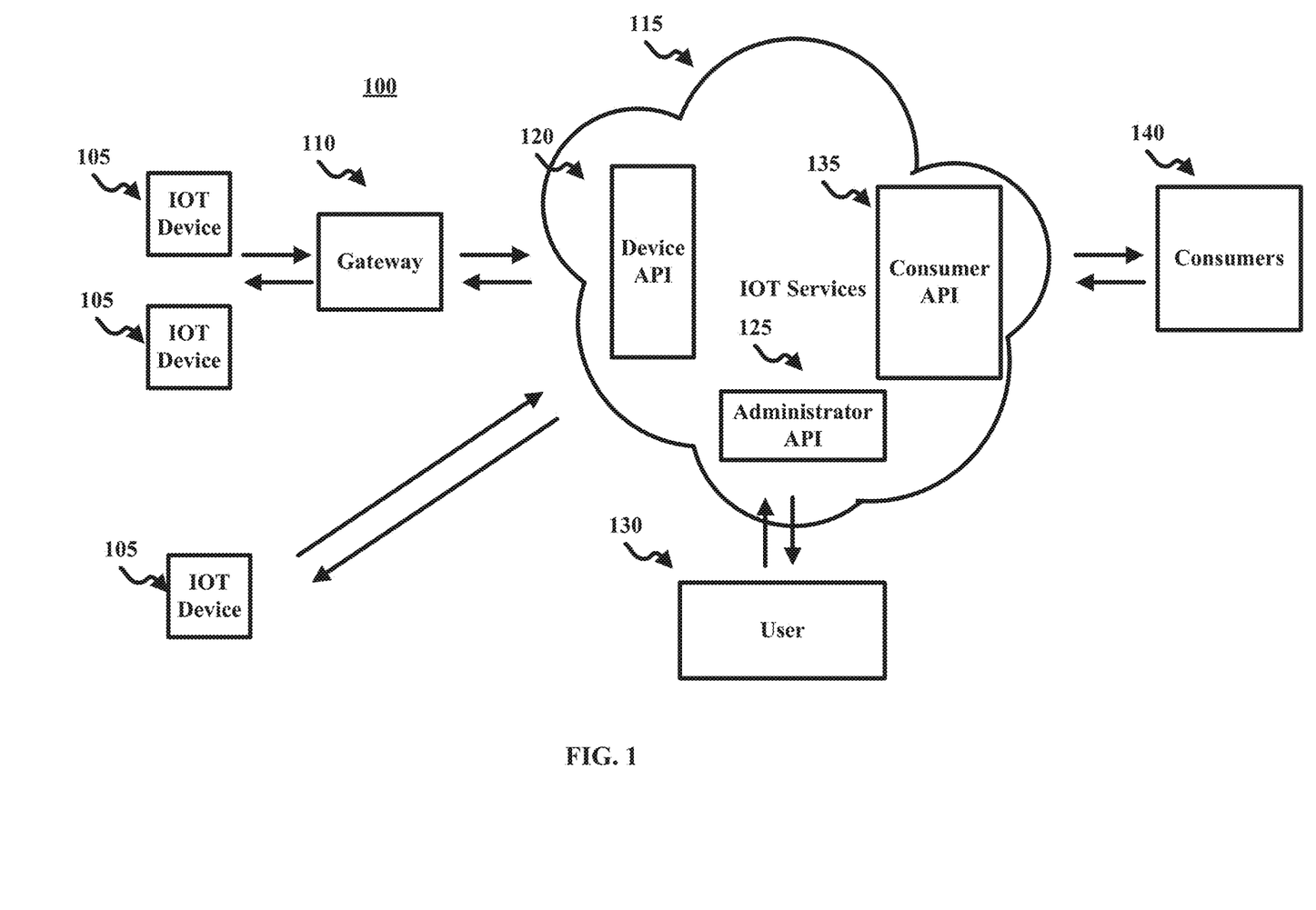
FIG. 1 illustrates an IOT environment including an IOT service, according to various aspects of the present disclosure.

FIG. 1 illustrates an IOT environment 100 including an IOT service 115, according to various aspects of the present disclosure. While FIG. 1 illustrates various components contained in the IOT environment 100, FIG. 1 illustrates one example of an IOT environment and additional components can be added and existing components can be removed.

As illustrated, the IOT environment 100 can include a number of IOT devices 105. The IOT devices 105 can be any type of electronic device that is capable of communicating with other electronic devices. For example, the IOT devices 105 can include a wide variety of devices such as conventional computing device, smart phones, appliances (e.g. washer/dryers that utilize network communications, smart thermostat systems, etc.), sensors (e.g. remote monitoring heart monitoring implants, biochip transponders, automobiles sensors, etc.), and the like.

In aspects, the IOT devices 105 can include the necessary hardware and software to directly communicate with an IOT service 115. In this example, the IOT devices can include the necessary hardware and software to communicate with the IOT service 115 using various protocols supported by the IOT service such as publish-subscribe messaging protocols, i.e., Message Queue Telemetry Transport ("MQTT"), and Domain Name System ("DNS") processes and services. Likewise, the IOT devices can be connected to an intermediary, such as a gateway 110. In this example, the gateway 110 can include the necessary hardware and software to communicate with the IOT devices 105 and the necessary hardware and software to communicate with the IOT service utilizing various protocols supported by the IOT service such as MQTT and DNS processes and services.

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 192.0.2.78, and assigned to computers on the Internet. Each domain name can be made up of a series of character strings (e.g., labels) separated by dots. The order of the labels represents a relationship between domain names within the DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Domains can nest within the hierarchy for many levels. For example, each second-level domain can include a number of third-level domains located immediately to the left of the second-level domain, e.g. the "www" level in www.example.com. The labels in a domain name include one or more characters, each of which may either be an ASCII character or a language-specific character (e.g., Arabic, Chinese, Hindi, and Latin letters with diacritics (e.g., é)). Domain names represented, in whole or in part, by language-specific characters are called Internationalized Domain Names (IDNs). While not yet available, potential IDN versions of well-known TLDs, such as ".com," ".net," and ".org." could also be created.

The responsibility for operating each TLD, including maintaining a registry of the second-level domains within the TLD, is delegated using a hierarchy of DNS services with different entities acting as the "registry" or "authoritative" registry for a portion of the hierarchy to a particular organization, known as a domain name registry ("registry"). The registry is primarily responsible for answering queries for IP addresses associated with domains ("resolving"), typically through DNS servers that maintain such information in large databases, and for operating its top-level domain.

For most TLDs, in order for end-users to obtain a domain name, that domain name has to be registered with a registry through a domain name registrar, an entity authorized to register Internet domain names on behalf of end-users. Alternatively, an end-user can register a domain name indirectly through one or more layers of resellers. A registry may receive registrations from hundreds of registrars.

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data, such as the IPv4 address for A records. Comments can be included by using a semi-colon and lines can be continued by using parentheses. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central registry to be continually consulted and updated. The DNS resolution process allows for users to be directed to a desired domain by a lookup process whereby the user enters the desired domain, and the DNS returns appropriate IP numbers. During the DNS resolution process, a request for a given domain name is routed from a resolver (e.g., a stub resolver) to an appropriate server (e.g., a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

According to aspects of the present disclosure, the IOT service 115 can assign a domain name to each of the IOT devices 105. The domain name can then be associated with the IP address of the IOT device 105. Domain names, i.e., qnames, can also be assigned by an entity owner of the IoT device 105. To facilitate the registration of IOT devices, an IOT service can provide an application programming interface (API) that performs DNS registration of IOT devices on behalf of devices and gateways (DNS API not shown). The IOT service 115 can provide a domain name that uniquely identifies the devices as IOT devices and also shows the relationship of the devices. For example, the IOT service 115 can establish a domain for IOT devices such as ".iotservice.example.com." As the devices are registered with the IOT service 115, the IOT service assigns the domain name and creates the DNS records for the IOT devices. For example, if the IOT devices 105 are owned by "Company A," the IOT service can create a domain "companyA.iotservice.example.com." The IOT service 115 can assign a unique domain name to each of the IOT devices, for example, "iotdevice1.companyA.iotservice.example.com." The domain and the domain names for each of the IOT devices allow consumers 140 to locate and communicate with the IOT devices 105.

The IOT service 115 can also include an API 125 to allow a user 130 to communicate with the IOT service 115. The user 130 can communicate with the IOT service to establish the services of the IOT service 115, register devices 105, and the like. The IOT service 115 can also include an API 135 to allow the consumers 140 to locate and communicate with the IOT devices 105. In some aspects, one or more services provided by the IOT service 115 can reside in the cloud.

Figure 2:
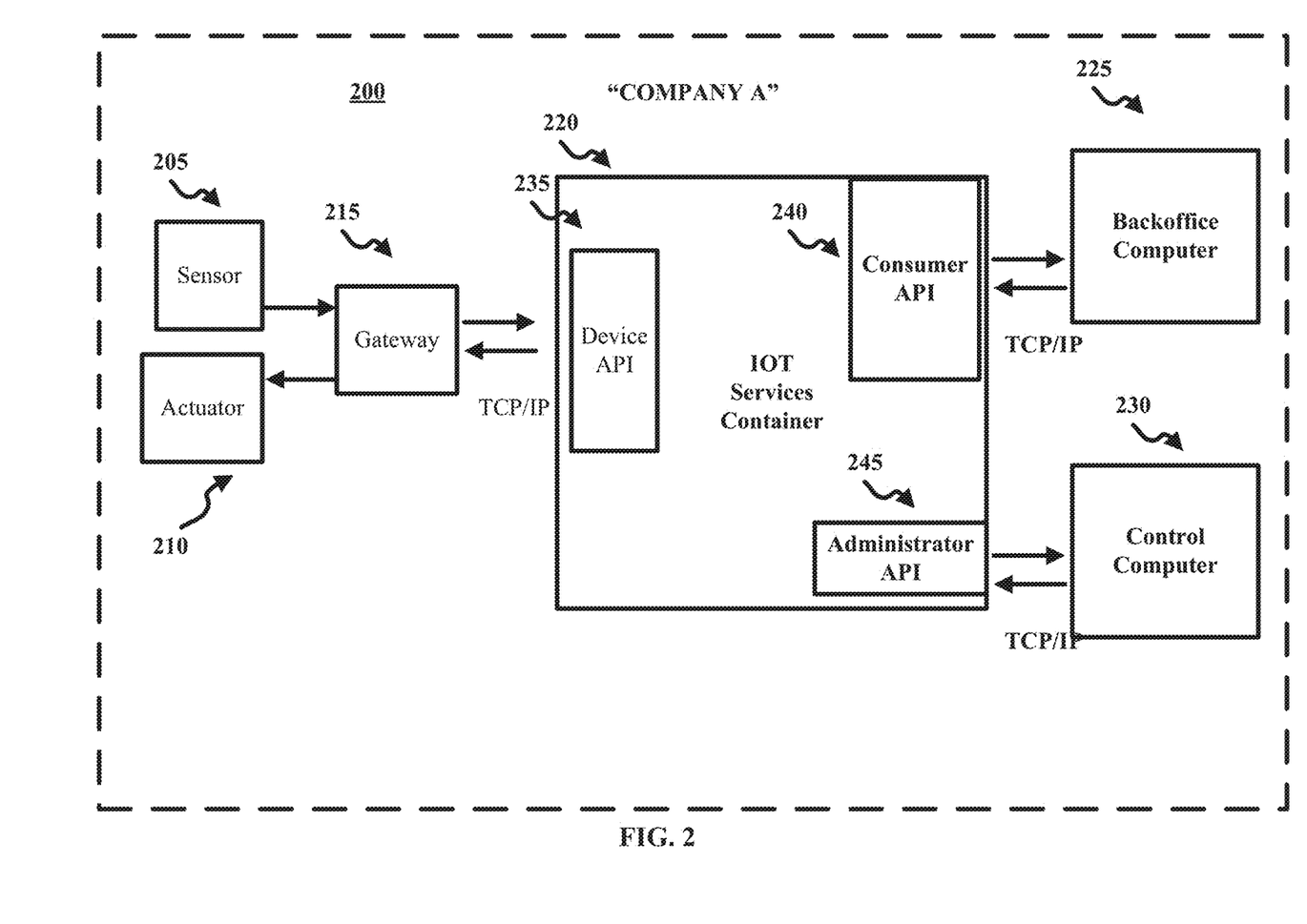
FIG. 2 shows an example internal organization environment (denoted by "Company A") having one or more IoT devices that can utilize an IOT service, according to various implementations.

FIG. 2 shows an example internal organization environment 200 (denoted by "Company A") having one or more IoT devices that can utilize an IOT service, according to various implementations. As illustrated in FIG. 2, the internal organization environment can include a first IoT device, shown as sensor 205, and a second IoT device, shown as actuator 210, which are in communication with a gateway device 215. The IoT devices can be utilized by Company A in daily operations. For example, the sensor 205 can monitor the temperature of a piece of manufacturing equipment and the actuator 210 can be a component of the manufacturing equipment, e.g. cooling fan. Company A can desire to monitor and utilize the IoT devices using a IoT service.

In this example, the IoT service can be implemented as an IoT services container. An IoT services container provides one or more services to an IoT device via one or more APIs. The one or more services can include, but are not limited to, an administrative service, a datameter service, a crawler service, a messaging service, a DNS service. The IoT services container 220 is arranged between the gateway device 215 and a back office computer 225 and a control computer 230. In some example, the IoT services container can be included in the gateway device 215. The IoT services container can be hosted by Company A or can be hosted by a separate entity or organization.

In this example, the sensor 205, such as a temperature sensor, can detect the temperature of a particular area of Company A and send temperature readings, either continuously or periodically, to the to the gateway device 215 through a data feed. The gateway device 215 can communicate with the IoT services container 220, through a device API 235 over a communications protocol, i.e., TCP/IP, to provide the data feed to subscribers/consumers thereof. The back office computer 225, through a consume API 240 of the IoT services container 220 over a communications protocol, i.e., TCP/IP, may be operable to perform various functions, including, but are not limited, administrative, record keeping, etc. The control computer 230, through an administrator API 245 of the Iot services container 220 over a communication protocol, i.e., TCP/IP, may be operable to monitor the temperature from the sensor 205 and determine that a particular action is warranted based its readings. In this example, if the control computer 230 determines that the temperature monitored by the sensor 205 is too high, the control computer 230 can send a signal through the IoT services container 220 to the actuator 210 to lower the temperature by turning on a fan for a given time period According to aspects of the present disclosure, the IOT service 115 can utilize DNS process and services, such as DNS-based Authentication of Named Entities (DANE) and DNSSEC to register and authenticate IOT devices, this enabling authentication of data received from IOT devices and also supporting encryption of data sent by IOT devices. DANE provides a mechanism for associating the public key or a certificate containing a public key with an IOT device that can be identified by means of a unique domain name associated with a device. This association of a device with its public key or certificate containing a public key is stored in DNS registry records, either TLSA or SMIMEA, that are identified by the unique domain name associated with a device The need for IoT device authentication becomes more apparent as more and more IoT devices are attached to the Internet. As a result, it becomes less and less likely that there will be direct communication between the IoT devices and the applications that will be used to monitor and control them. The current model for authentication is based on verifying the endpoints of the communication where typically the client verifies the X.509 certificate provided by the server against the local trust store, and the server verifies the client based on a credential. The credential provided by the client is typically a username/password combination, an API key, or an X.509 client certificate. When interaction between the IoT device and the application is separated messaging middleware, such as a message bus of a middleware container, the current model requires placing trust in the message bus. The IoT device authenticates with the message bus and the application authenticates with the message bus. However, since there is no direct communication between the IoT device and the application, the IoT device never authenticates with the application and the application never authenticates with the IoT device. It is also possible that many, untrusted entities may exist between the IoT device and the application. For instance, due to unreliable or intermittent communication, it may be desirable to introduce multiple gateways and/or multiple containers, each of which are capable of storing a message until network conditions are such that the message can be forwarded along the path towards the destination.

As a consequence, two entities, i.e, the IoT device and the application (or another IoT device or a container), would benefit by a mechanism of validating that the information they receive came from the expected source and was not modified in transit, even when the information passed through one or more untrusted intermediaries. The approach to validating the information sources in these scenarios taught in the invention described here-in is based on creating a binding between a name and a public key in a globally accessible registry. This validation mechanism can be arranged such that one entity, i.e., the IoT device, first generates a private and public key pair. The private key is stored locally within an electronic memory of the IoT device. The name of the IoT device and the public key is sent to a globally accessible registry, i.e., a DNS registry, where it is stored. When the IoT device has information to send, the IoT device generates a payload in an application specific way. A cryptographic signature is computed over the name of the IoT device and the payload. The resulting message is the combination of the name of the IoT device, the payload, and the cryptographic signature.

The message is then forwarded towards the recipient, i.e., an application, another IoT device, or a container. When received by the recipient, the name of the IoT device, the payload, and the signature are extracted from the message. The public key of the IoT device is retrieved from the globally accessible registry using the name of the IoT device as the key. The public key is used by the recipient to verify the source of the message and that the message has not been modified in transit. Every entity has a private/public key pair. The private key is used by the entity for signing data to be sent and decrypting data that is received, and the public key is used by entities wishing to verify the authenticity of signed data received from an entity and/or to encrypt encrypted data to be sent to an entity.

DANE can be used for authentication and privacy for entities registered into the DNS as described above, i.e., IoT devices, containers, and applications. DANE provides a standards-based mechanism for storing and retrieving the public keys used in authentication and encryption mechanisms. The public key for registered entities is available from DNS by querying the DNS for the DANE defined record corresponding to the entity. The record to be retrieved is identified in the query using a derivation of the domain name (qname) as the search value. A retrieved record containing the public key for an entity is the one created by the IOT registration process. These records will be of a type defined by the DANE protocol, either TLSA or SMIMEA. Messages (data) that are digitally signed with the corresponding private key of the IoT device can be authenticated using the public key that is registered in DNS.

The integrity of the authentication and encryption processes described herein relies on trusting that only the entity to which a private key applies will use that private key to sign messages or for decrypting communications (messages) received by the entity. Entities are expected to keep the private key in secure storage in which only the entity has access. An entity can use the private and public keys as part of a communication using a secure transport, TLS/DTLS. This present disclosure also applies to messages originated from an entity and which have been signed by the entity as a means of assuring the authenticity of such messages. Additionally, a device (A) could encrypt messages using the public key of another device (B) so as to protect the privacy of the data contained in the messages. Since only device B has the private key, only device B is able to decrypt the message.

Entities communicate with each other via IOT message services. One example of such a service is a publish/subscribe messaging infrastructure on which a feed-based messaging protocol is based. In this example, an entity can publish messages to a specific feed based on a feed identifier (feed ID) that is unique within the messaging service. Entities subscribed to a feed identified by that feed identifier will receive messages published to the feed. The message data published to feeds can be described with a shared ontology that standardizes the terms used for the data elements contained in messages, i.e., temperature, speed, etc. Message flows are typically one-way. Two-way messaging uses two one-way flows i.e. for two entities to communicate, each would subscribe to a feed to which the other publishes messages. Entities can be broadly characterized as IoT devices, applications, services, and containers (IoT service containers), and can be grouped into a variety of arrangements including, but not limited to the following: a device (such as a thermometer) that publishes data (such as temperature) to a feed, which then provides that data to an entity interested in using that data (a web app that displays current temperature); an entity (a light bulb) that can be controlled via messages it receives from a feed it subscribes to which a controlling entity (Web app) publishes control messages (toggle light bulb on and off).

Figure 3A:
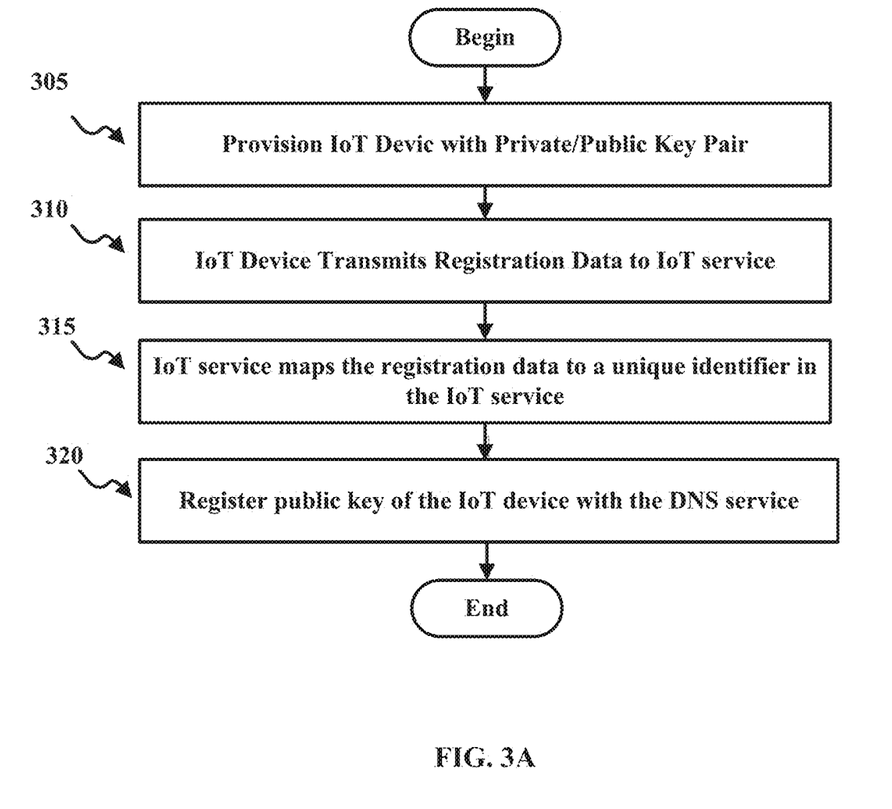
FIGS. 3A and 3B show an example IoT registration process with the DNS, according to aspects consistent with the present disclosure.
Figure 3B:
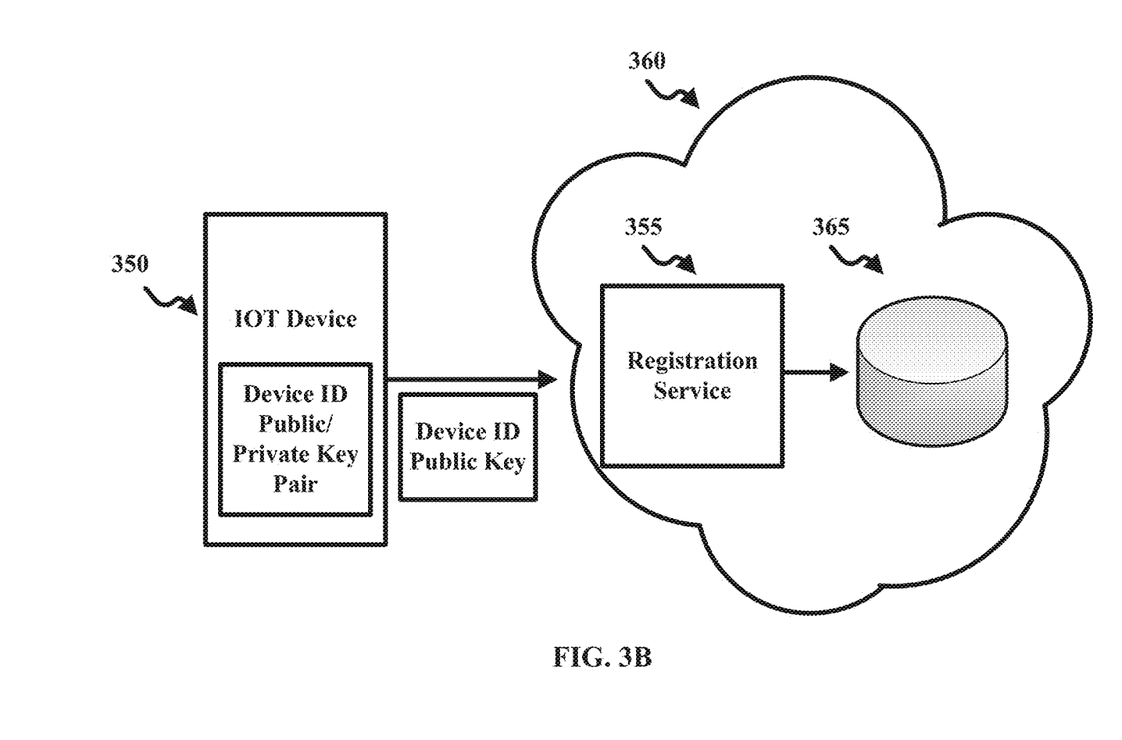

FIGS. 3A and 3B show an example IoT registration process with the DNS, according to aspects consistent with the present disclosure. Once the process begins, in 305 an IoT device is provisioned with a public/private key pair. For example, as illustrated in FIG. 3B, IoT device 350 can comprise a device ID and public/private key pair. The IoT device 350 can be provisioned with the public/private key pair in a variety of ways including: (1) embedded in IoT device 350 at manufacturing; (2) generated by the IoT device 350; (3) generated/regenerated by the IoT device 305 based on "factory reset," time-to-live configuration, or request from an authorized entity, (4) generated by a third party (e.g. IoT service), and the like.

In 310, the IoT device transmits registration data to an IoT service. For example, the IoT device 350 can communicates with a registration service 355 of an IoT service 360. For instance, the IoT device 350 can communicate registration data such as the device ID, and the public key to the registration service 355. Likewise, the IoT device 350 can transmit any additional registration data to the registration service 355, which can assist in the registration, such as IoT device type, location, owner of the IoT device, type of data collected by the IoT device etc.

Once received, in 315, the IoT service can map the registration data to a unique identifier in the IoT service. For example, the registration service 355 can be configured to map the device ID of the IoT device 350 to a "qname," which is a valid identifier for the DNS 365. As illustrated in FIG. 3B, the DNS 365 can be part of the IoT service 360. Likewise, the DNS 365 can be a standalone service and hosted by a separate entity.

Next, in 320, the public key of the IoT device can be registered with the DNS service. For example, the registration service 355 can act on behalf of the IoT device 350 to register its public key in the DNS 365. In this process, the registration service 310 can first map the device ID of the IoT device 350 to a unique qname. The qname can be a valid DNS identifier, i.e., domain name. The registration service 355 can then interact with the appropriate DNS server to create DNS entries for qname including one to contain the public key for the IoT device 350. The DNS record could be either a TLSA or SMIMEA record. The registration service 310 can be service provided by a DNS registry or another entity.

Figure 4A:
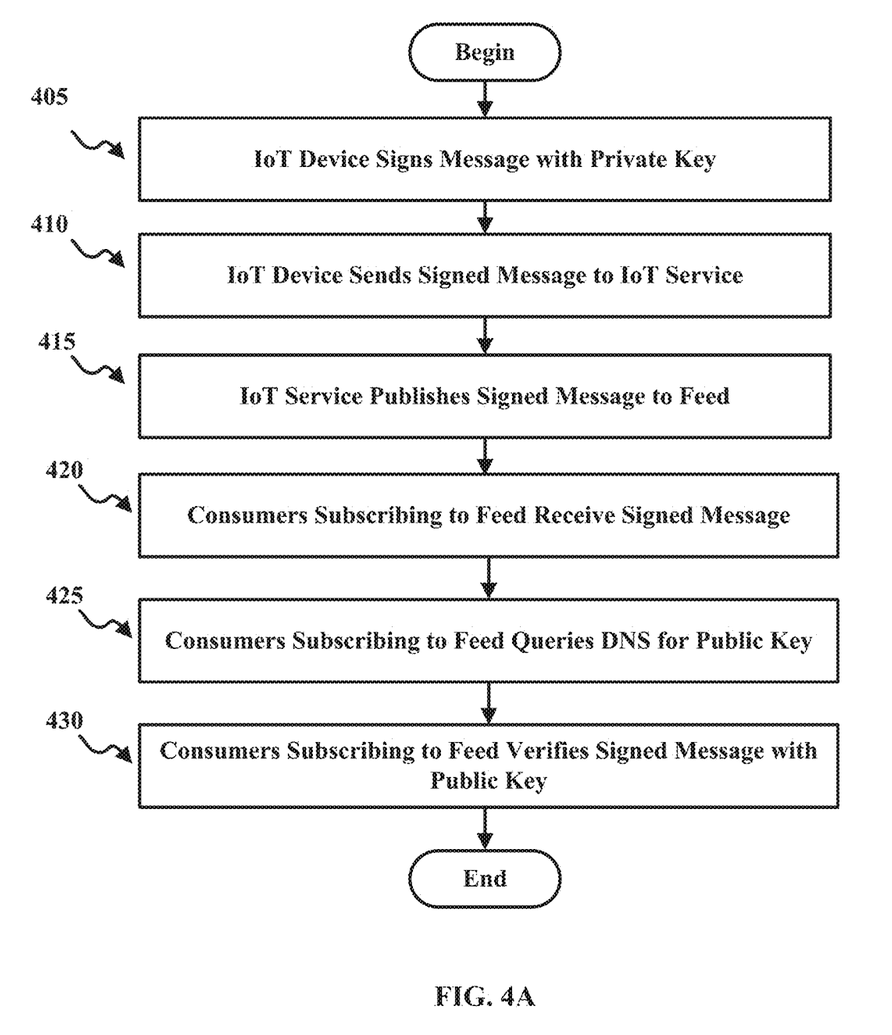
FIGS. 4A and 4B show an example data stream verification process using DNS and DANE, according to aspects consistent with the present disclosure.
Figure 4B:
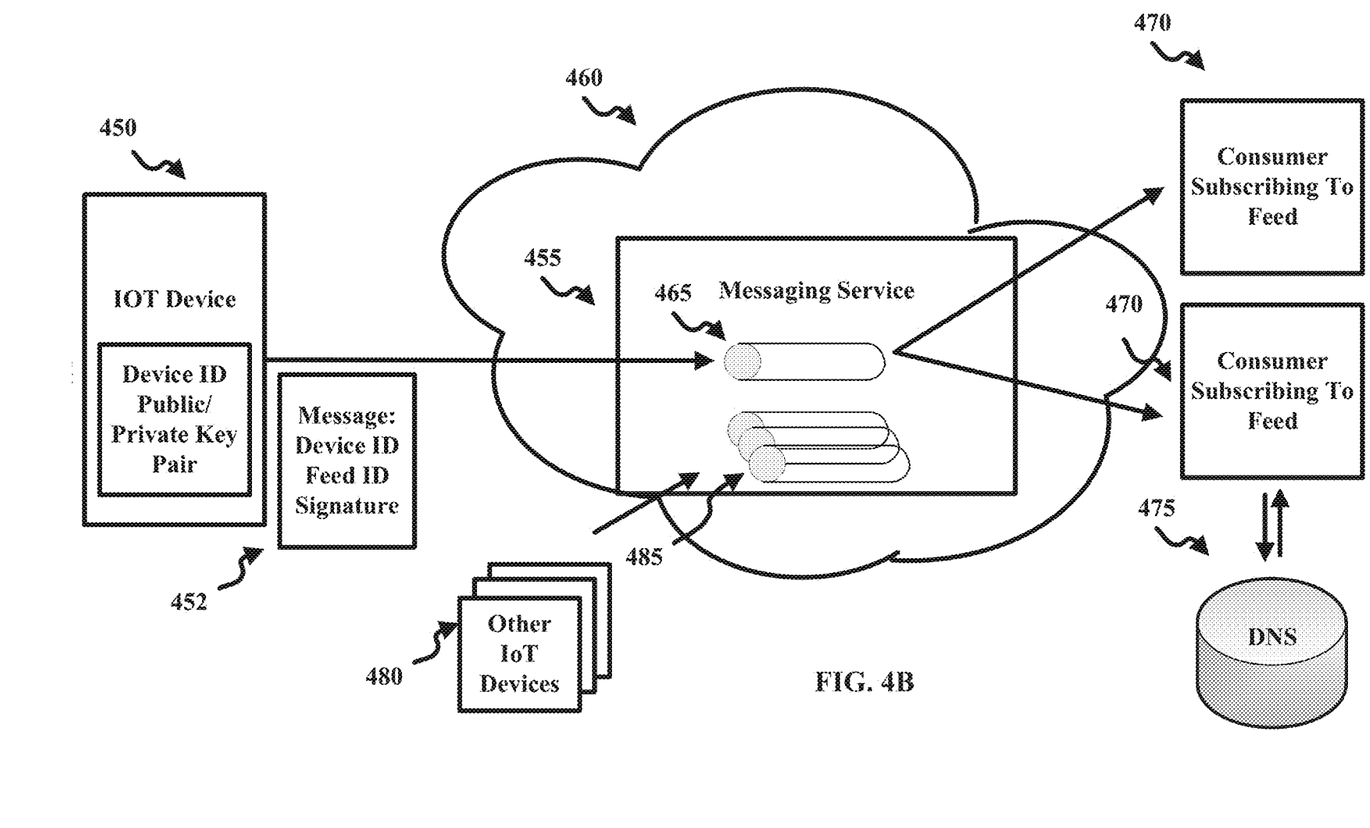

FIGS. 4A and 4B show an example data stream verification process using DNS and DANE, according to aspects consistent with the present disclosure. Once the process begins, in 405 an IoT device signs a message with a private key. For example, as illustrated in FIG. 4B, IoT device 450 can publish data to a data feed. The IoT device 450 can include an IoT device ID, a private key of a public/private key pair, data, and a feed ID that is used to identify the data that is generated by the IoT device 450 to be published. The feed ID to which the IoT device 450 publishes can be configured by an out-of-band process. The public/private key pair can be generated by the processes discussed above in FIGS. 3A and 3B. The public key can be published in a DNSSEC secured zone file (SMIMEA or TLSA with usage type either 1 or 3 and matching type 0 ["1 0 0", "1 1 0", "3 0 0", "3 1 0"]). The usage type must be either 1 or 3 to indicate that the public key is the actual public key for the device. The selector can be either type 0 or 1 as both formats include the public key. The matching type must be 0 so that the public key can be extracted from the data in the resource record. The message 525 can include the device ID, the feed ID, and the digital signature of the IoT device 450 (the message 525 signed by the private key of the IoT device 450).

In 410, the IoT device 450 sends the signed message 452 to an IoT service. For example, the IoT device 450 can communicate with a messaging service 455 of an IoT service 460. For instance, the IoT device 450 can communicate the signed message 452 such as the device ID, the feed ID to the messaging service 455.

Once received, in 415, the IoT service 460 can publish the signed message to a data feed 465. The IoT service 460 can also receive additional signed messages from other IoT devices 480 and publish those additional signed messages to additional data feeds 485. The digitally signed message 452 from the IoT device 450 and from other IoT devices 480 can then be published to the feed identified by the feed ID. The messaging service 455 can include records for the feed for a particular feed ID from the IoT device 450 as well as other feeds associated with other feed IDs from other IoT devices 480.

Next, in 420, the subscribers (also called consumers or recipients) 470, i.e., applications, other IoT devices, IoT service containers, and other entities, can subscribe to a feed identified by a specific feed ID and receive messages published to that feed. When the subscriber 470 receives a message, the subscriber 470 uses the IoT device ID from the message to determine the qname for the IoT device in 425. The subscriber 470 performs a DNS query to the DNS 475 to look up the DNS record for the qname that contains the public key for the IoT device 450. At 430, the subscriber 470 then uses the public key to verify the digital signature on the message 452. In some instances, the message 452 may be contained within another message (not shown) with the containing message signed by the IoT device/subscriber which generated the containing message. This allows for a method for data provenance as signatures for all messages signers provides evidence of the routing/handling of a message.

Figure 5A:
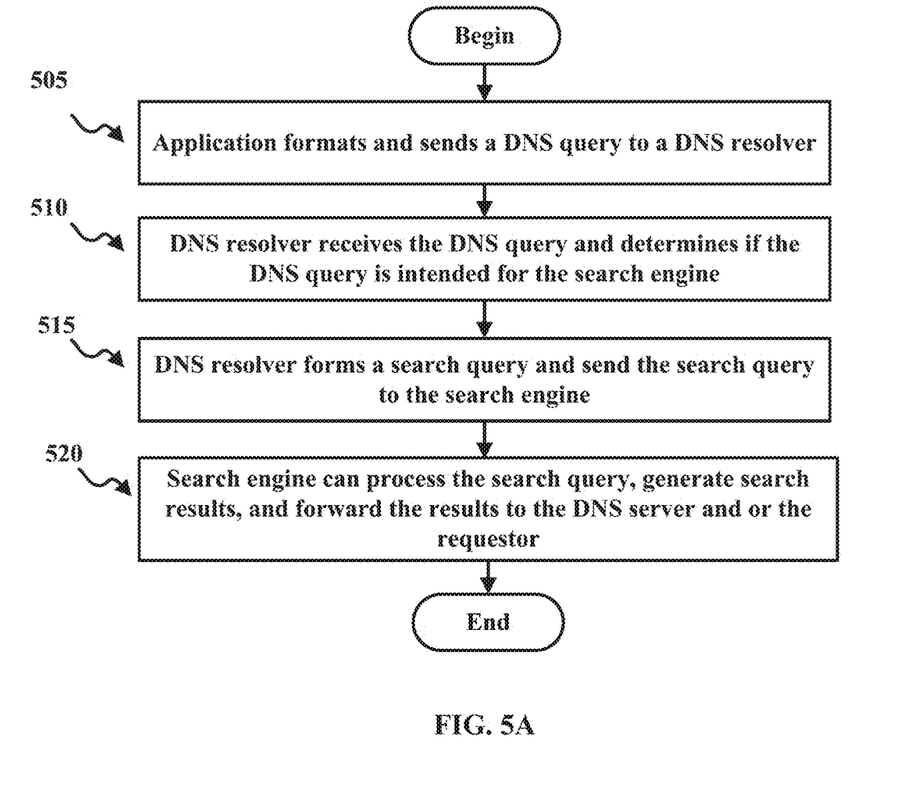
FIGS. 5A and 5B shows an example discovery process that can allow for the extension of DNS to transparently interact with search engines, in accordance with aspects consistent with the present disclosure.
Figure 5B:
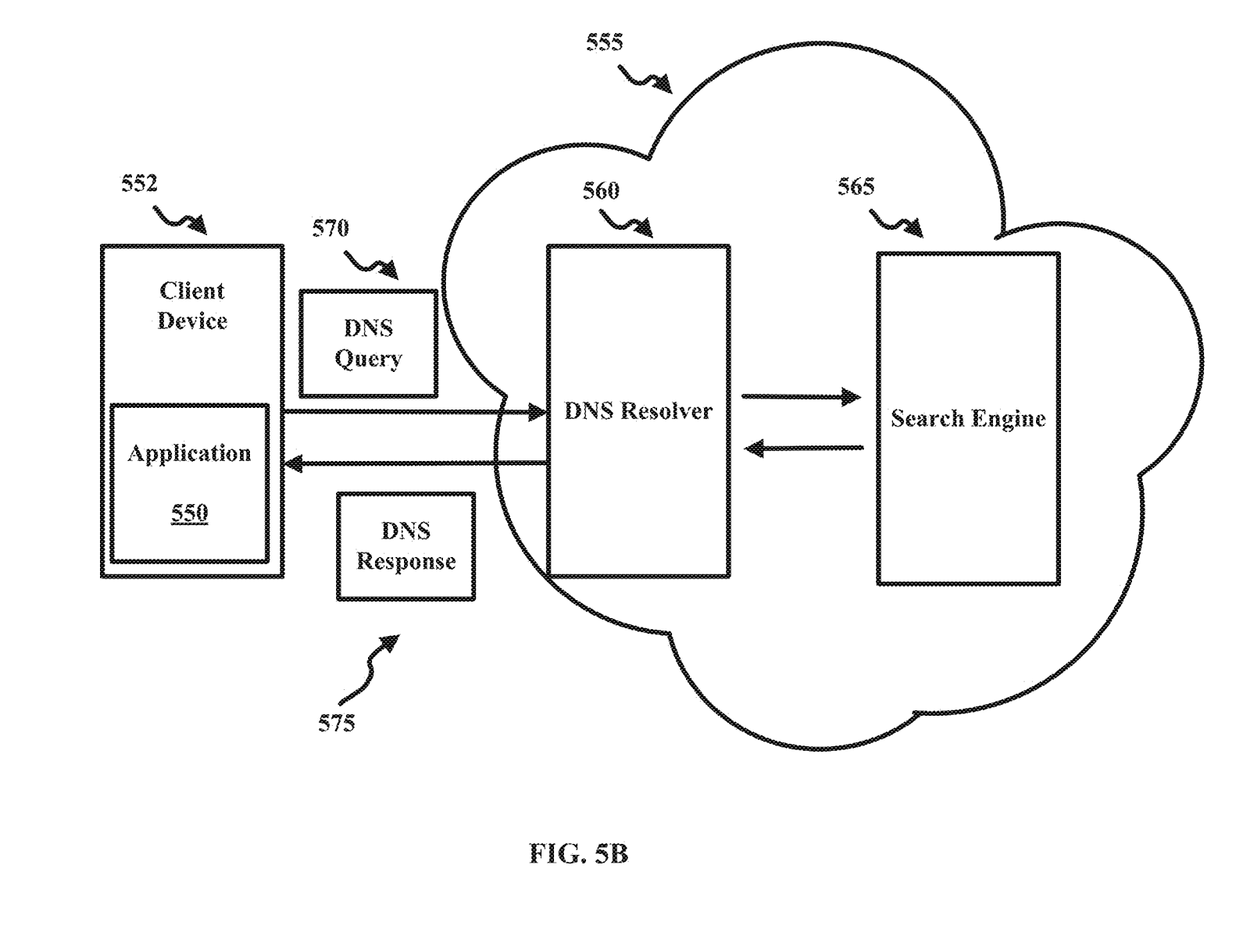

In some aspects, an IoT device has associated with it a DNS service (SRV) record, (defined in RFC 2782) or a text (TXT) record that is used to define a location, i.e., a hostname and port number, of one or more services provided by the IoT device, to discover a gateway and IoT device. In such case, standard DNS queries based on the DNS-SD (defined in RFC 6763) standard can be used to discover those records. However, this mechanism has limitations in the flexibility and retrieval capabilities of the search mechanism. In the case of IOT, it is desirable that more powerful search mechanisms be available for discovering devices that are registered in the DNS. To support this, a method is disclosed here-in for extending the DNS query mechanism to interact with external search engines. FIGS. 5A and 5B shows an example discovery process that can allow for the extension of DNS to interact transparently with search engines, in accordance with aspects consistent with the present disclosure.

After the process begins, in 505, an application can format and send a DNS query to a DNS resolver. For example, as illustrated in FIG. 5B, an application 550 running on a client device 552 can format and send a DNS query 570 to a DNS resolver 560, i.e., a stub resolver, a recursive DNS server, or other DNS resolver. The DNS query 570 can include some characteristics of the query format, the domain name being resolved and/or the record type being requested that flags to the DNS resolver 560 that the request is targeted for resolution via a search engine 565 rather than be resolved by the DNS resolver 560. The DNS query 570 can be a new query type or an existing query type with a flag that can be interpreted by the DNS resolver 560 to send the query to a search engine 565 for processing. In one example, the DNS query 570 can include a first portion that includes search parameters that can be interpreted to indicate a specific external search engine to use. The DNS query 570 can include a second portion that includes information indicating a type of search to be performed. The DNS query 570 can include a third portion that includes a domain that is a flag that the DNS query 560 is intended for an external search. For example, the DNS query could be for the IP address that corresponds with a domain name, such as, return IP address for "myquery01-temperature-coordinates75-09-15-36-05-04.iot.search.mydomain.com."

As illustrated in FIG. 5B, the DNS resolver 560 and the search engine 565 can be part of an IOT service 555. Likewise, the DNS resolver 560 and/or the search engine 565 can be part of other services or devices.

In 510, the DNS resolver receives the DNS query and determines if the DNS query is intended for the search engine. The mechanism whereby the DNS resolver 560 is able to determine that the DNS query 570 is intended for the search engine 560 can include the following examples. In one example, a domain name within the DNS query 570 can be formatted according to a particular naming convention where part of the domain name is a flag to indicate the external search engine to use. In another example, a new DNS query type can be defined and supported by the DNS resolver 560, e.g. the stub resolver or the recursive DNS server, to allow for the DNS query in this new format to be searched by a search engine 565 rather than resolved by a DNS resolver 560.

Then, 515, if the DNS query is intended for the search engine, the DNS resolver can form a search query and send the search query to the search engine. As illustrated in FIG. 5B, for example, the DNS resolver 560 can then interpret the DNS query 570 to form a query to the search engine 565 indicated by the DNS query 570 and can send the query to the search engine 565.

In 520, the search engine can process the search query, generate search results, and forward the results to the DNS server and or the requestor. For example, the search engine 565 can process the query and generates a result of 0 or more IP addresses and/or domain names that serve as the result of the query. The search engine 565 or the DNS resolver 560 can then create a transient IP address that provides an interaction point for retrieving the search results and stores the search results at the interaction point. For example, the DNS resolver 560 could store search results on the local machine and then return the IP address of the local machine to the originating application 550.

The originating process can then use the returned IP address to retrieve the results of the query. For example, if the results are stored locally by the DNS resolver, the returned IP address might be 127.0.0.1 and the originating process could retrieve them using a known port and folder, i.e., 127.0.0.1:9999/myquery-01-temperature-coordinates75-09-15-36-05-04.

In some aspects, processing for the IoT device can be arranged at one or more edge locations (geographically dispersed) to reduce and simplify data amount and load. For example, by running a container (a collected set of IoT services assessable from a common location on the Internet) on edge locations allow the containers to get closer to production point or IoT devices. The edge processing can allow for a reduction of the data size in the path between the producer and the consumer that provides for a conservation of bandwidth resources. If processing is not required or is not reducing the data size, then arranging processing at edge location allows for the path between the producer and consumer to be minimized so that the consumer gets the data as soon as possible.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 6:
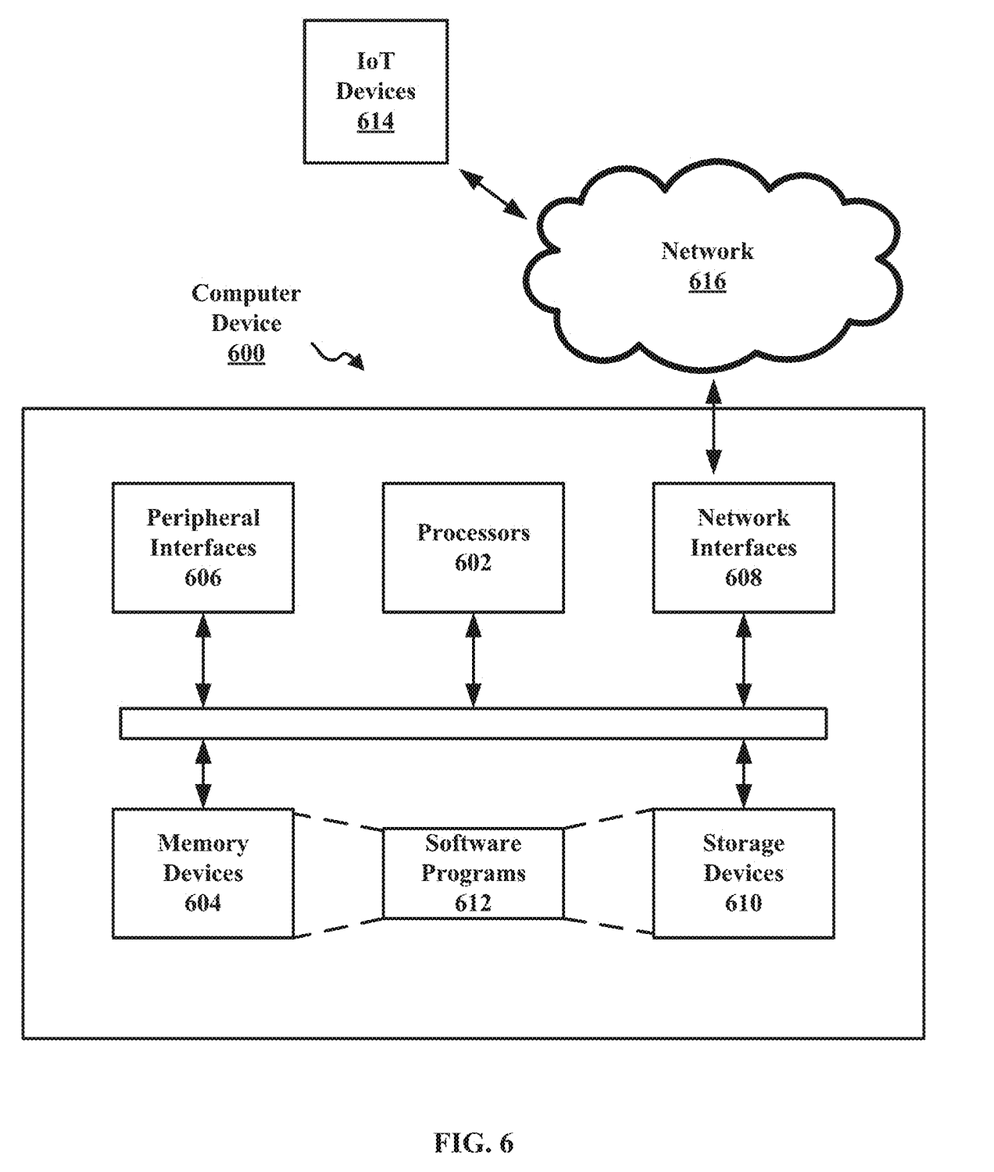
FIG. 6 illustrates an example of a hardware configuration for a computer device, that can be used to perform one or more of the processes of the IoT service.

For example, FIG. 6 illustrates an example of a hardware configuration for a computer device 600, that can be used to perform one or more of the processes of the IoT service described above. While FIG. 6 illustrates various components contained in the computer device 600, FIG. 6 illustrates one example of a computer device and additional components can be added and existing components can be removed.

The computer device 600 can be any type of computer devices, such as desktops, laptops, servers, etc., or mobile devices, such as smart telephones, tablet computers, cellular telephones, personal digital assistants, etc. As illustrated in FIG. 6, the computer device 600 can include one or more processors 602 of varying core configurations and clock frequencies. The computer device 600 can also include one or more memory devices 604 that serve as a main memory during the operation of the computer device 600. For example, during operation, a copy of the software that supports the IoT service can be stored in the one or more memory devices 604. The computer device 600 can also include one or more peripheral interfaces 606, such as keyboards, mice, touchpads, computer screens, touchscreens, etc., for enabling human interaction with and manipulation of the computer device 600.

The computer device 600 can also include one or more network interfaces 608 for communicating via one or more networks, such as Ethernet adapters, wireless transceivers, or serial network components, for communicating over wired or wireless media using protocols. The computer device 600 can also include one or more storage device 610 of varying physical dimensions and storage capacities, such as flash drives, hard drives, random access memory, etc., for storing data, such as images, files, and program instructions for execution by the one or more processors 602.

Additionally, the computer device 600 can include one or more software programs 612 that enable the functionality of the IoT service described above. The one or more software programs 612 can include instructions that cause the one or more processors 602 to perform the processes described herein. Copies of the one or more software programs 612 can be stored in the one or more memory devices 604 and/or on in the one or more storage devices 610. Likewise, the data, for example, DNS records, utilized by one or more software programs 612 can be stored in the one or more memory devices 604 and/or on in the one or more storage devices 610.

In implementations, the computer device 600 can communicate with one or more IoT devices 614 via a network 616. The one or more IoT devices 614 can be any types of devices as described above. The network 616 can be any type of network, such as a local area network, a wide-area network, a virtual private network, the Internet, an intranet, an extranet, a public switched telephone network, an infrared network, a wireless network, and any combination thereof. The network 616 can support communications using any of a variety of commercially-available protocols, such as TCP/IP, UDP, OSI, FTP, UPnP, NFS, CIFS, AppleTalk, and the like. The network 616 can be, for example, a local area network, a wide-area network, a virtual private network, the Internet, an intranet, an extranet, a public switched telephone network, an infrared network, a wireless network, and any combination thereof.

The computer device 600 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 600 as described above need not be enclosed within a single enclosure or even located in close proximity to one another. Those skilled in the art will appreciate that the above-described componentry are examples only, as the computer device 600 can include any type of hardware componentry, including any necessary accompanying firmware or software, for performing the disclosed implementations. The computer device 600 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The invention claimed is:

1. A method for authenticating a message produced by a first device, the method comprising:
 obtaining, by a second device, a first message via a first feed, wherein the first feed is included in a network in which the second device is configured to access the first feed, wherein the first message is published to the first feed by the first device, wherein the first message has been cryptographically signed by a first private key of a first asymmetric key pair associated with the first device, and the first message comprises a data payload and a first identifier of the first device;
 in response to obtaining the first message by the second device, sending, by the second device to a domain registry, a query for a first record associated with the first device, wherein the query for the first record is based on the first identifier, wherein the first device and the second device are both is separate from the domain registry, wherein the domain registry is configured to register a plurality of domain names and to store the first record, and wherein the first record includes the first identifier and a first public key of the first asymmetric key pair;
 in response to sending the query, obtaining, by the second device from the domain registry, the first public key of the first asymmetric key pair; and
 authenticating the first message using the first public key.

2. The method of claim 1, wherein the first record is TLSA record type.

3. The method of claim 1, wherein the first record is signed using DNSSEC.

4. A device for authenticating a message produced by a first device, the device comprising:
 a memory containing instructions; and
 one or more processors, operably connected to the memory, that executes the instructions to perform operations comprising:
  obtaining, by the device, a first message via a first feed, wherein the first feed is included in a network in which the device is configured to access the first feed, wherein the first message is published to the first feed by the first device, wherein the first message has been cryptographically signed by a first private key of a first asymmetric key pair associated with the first device, and the first message comprises a data payload and a first identifier of the first device;
  in response to obtaining the first message from the first device, sending, by the device to a domain registry, a query for a first record associated with the first device, wherein the query for the first record is based on the first identifier, wherein the first device and the device are both separate from the domain registry, wherein the domain registry is configured to register a plurality of domain names and to store the first record, and wherein the first record includes the first identifier and a first public key of the first asymmetric key pair;
  in response to sending the query, obtaining, by the device from the domain registry, the first public key of the first asymmetric key pair; and
  authenticating the first message using the first public key.

5. The method of claim 1, further comprising obtaining, by the second device, the first record from the domain registry.

6. The method of claim 1, further comprising, publishing, by the first device, the first message to the first feed.

7. The method of claim 6, wherein the first message includes a first feed identifier associated with the first feed, and the second device obtains the first message from the first feed based on the first feed identifier.

8. The method of claim 1, wherein the first identifier comprises a domain name associated with the first device.

9. The device of claim 4, wherein the first record is TLSA record type.

10. The device of claim 4, wherein the first record is signed using DNSSEC.

11. One or more non-transitory computer-readable media including instructions that, when executed by one or more processors, cause the one or more processors to authenticate a message produced by a first device, by performing the steps of:

obtaining, by a second device, a first message via a first feed, wherein the first feed is included in a network in which the second device is configured to access the first feed, wherein the first message is published to the first feed by the first device, wherein the first message has been cryptographically signed by a first private key of a first asymmetric key pair associated with the first device, and the first message comprises a data payload and a first identifier of the first device;

in response to obtaining the first message by the second device, sending, by the second device to a domain registry, a query for a first record associated with the first device, wherein the query for the first record is based on the first identifier, wherein the first device and the second device are both separate from the domain registry, wherein the domain registry is configured to register a plurality of domain names and to store the first record, and wherein the first record includes the first identifier and a first public key of the first asymmetric key pair;

in response to sending the query, obtaining, by the second device from the domain registry, the first public key of the first asymmetric key pair; and     authenticating the first message using the first public key.

12. The one or more non-transitory computer-readable media of claim 11, wherein the first record is TLSA record type.

13. The one or more non-transitory computer-readable media of claim 11, wherein the first record is signed using DNSSEC.

* * * * *

UNITED STATES PATENT AND TRADEMARK OFFICE
CERTIFICATE OF CORRECTION

PATENT NO. : 11,323,422 B2
APPLICATION NO. : 15/701408
DATED : May 3, 2022
INVENTOR(S) : Stephen Daniel James et al.

It is certified that error appears in the above-identified patent and that said Letters Patent is hereby corrected as shown below:

In the Claims

In Claim 1, Column 14, Line 23, "the second device are both is separate from the domain" should read -- the second device are both separate from the domain --.

Signed and Sealed this
Fifth Day of July, 2022

Katherine Kelly Vidal
*Director of the United States Patent and Trademark Office*